ELECTRICAL CONTACT

Filed March 2, 1966

United States Patent Office 3,383,638

Patented May 14, 1968

3,383,638

ELECTRICAL CONTACT

Daniel Russell Coldren, Enola, Pa., assignor to AMP Incorporated, Harrisburg, Pa.

Filed Mar. 2, 1966, Ser. No. 533,132

1 Claim. (Cl. 339—17)

ABSTRACT OF THE DISCLOSURE

A contact receptacle is provided for mounting on a printed circuit board or the like and for receiving a male tab member at right angles to the board. The receptacle will electrically connect the component from which the tab extends to the circuitry on the board. The contact spring fingers lie parallel to the board and are designed to permit minimum tab length and minimum overall receptacle size. The fingers also are designed to permit entry of the tab from either side of the board.

A principal object of the present invention is to provide a contact receptacle which is of sturdy construction and relatively inexpensive to produce.

A further object is to provide a receptacle having a spring design which allows extreme compactness in the overall size of the receptacle.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purpose of illustration in order that others skilled in the art may fully understand the invention and the principles thereof and the manner of applying it in practical use so that they may modify it in various forms, each as may be best suited to the conditions of a particular use.

In the drawings, in which like reference numerals refer to like parts:

Printed circuit boards normally carry many electrical components and the customary manner of mounting the components is to provide apertures through the printed circuit board through which will extend the tabs of the components. The tabs are then dip soldered to insure electrical connection between the tabs and the circuitry strips on the board. This method of assembling the components gives rise to problems when it is desirable to replace a component for one reason or another, such as failure of the component. The task of removing a component by breaking the soldered connection is a difficult one and often leads to the necessity for replacing the entire printed circuit board together with all of its components. This invention provides a contact receptacle which will be mounted in the printed circuit board and soldered to the circuitry strips thereof to remain permanently in place. The electrical components are then plugged into the receptacle thereby rendering it an easy task to replace any of the components as desired, such replacement being effected by merely unplugging the tab of the component from the spring contacts of the receptacle.

Figure 1:
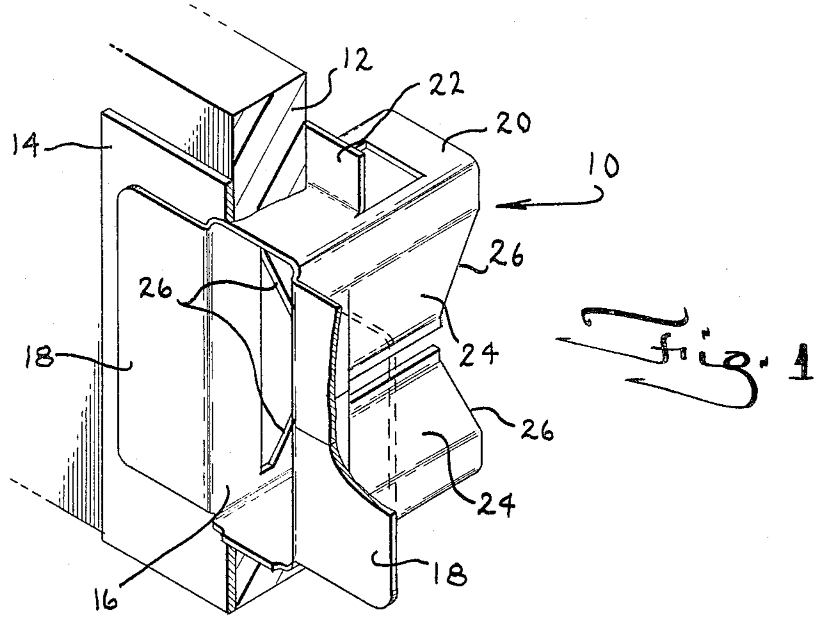
FIGURE 1 is a perspective view of a contact receptacle made in accordance with the teachings of the present invention and mounted in a printed circuit panel.

As seen in FIGURE 1 there is a receptacle indicated generally at 10 mounted in an aperture in a printed circuit board 12 having conductive circuitry strips 14 secured thereto. The receptacle is formed from a flat sheet metal stamping and comprises a rectangular strap portion 16 and a pair of securing tines 18 extending from the strap portion, the tines overlying the circuitry strips 14 for soldering thereto. A pair of sidewalls 20 extend perpendicularly from the strap portion, each wall having a tab 22 formed therein. Upon insertion of the receptacle into the printed circuit board the tines 18 will be staked outwardly to thereby cooperate with the tabs 22 for maintaining the receptacle in position on the board.

Figure 3:
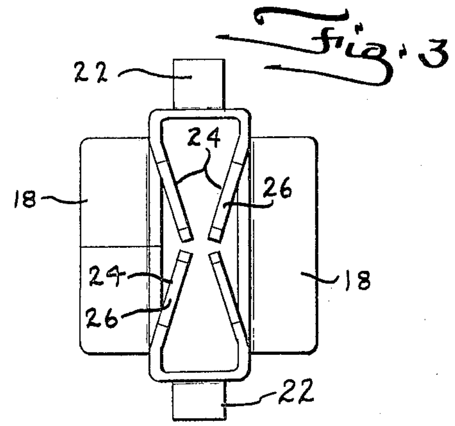
FIGURE 3 is a front elevational view of the receptacle of FIGURE 1.
Figure 2:
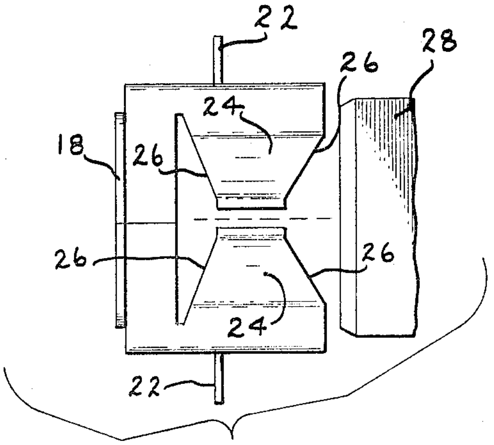
FIGURE 2 is a side elevational view of the receptacle of FIGURE 1 about to receive a tab member.
Figure 4:
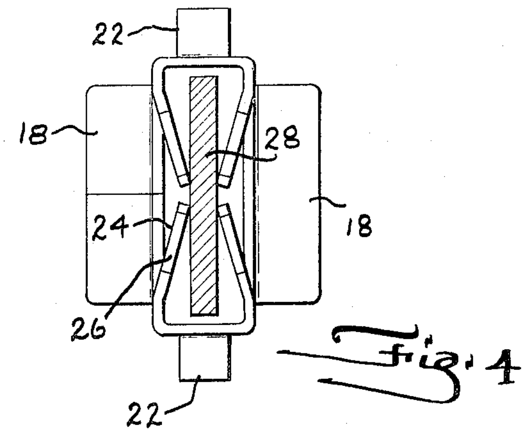
FIGURE 4 is a view similar to FIGURE 3 but showing a tab member in place within the receptacle.

A pair of spring arms or fingers 24 extend from each of the sidewalls 20 generally at right angles thereto. The free ends of the fingers 24 converge towards each other and, as seen in FIGURE 3, the four ends of the fingers are disposed in adjacent relationship. The spacing between the fingers of each pair is less than the thickness of the tab to be received by the receptacle. As best seen in FIGURE 2 the fingers 24 are provided with laterally offset portions 26 along the side edges thereof. These offset or angled edges provide a lead in for the tab such as 28 shown in FIGURE 2. As the tab is inserted into the receptacle the side edges 26 will be contacted and will act as a ramp to force the spring fingers 24 outwardly to thus allow entry of the tab. FIGURE 4 shows the tab 28 seated in position within the receptacle 10 and shows the fingers 24 in firm engagement with the sides of the tab.

It can be seen from the drawings that the fingers have angled edges on both sides thereof whereby entry of the tab 28 is possible from either side of the receptacle. However, in normal use the tab would be inserted into that end of the receptacle which is opposite to the securing means 18.

It is extremely advantageous to dispose the spring fingers of the receptacle at right angles to the direction of entry of the tab as shown in the fingers. This disposition of the spring fingers allows for entry of a tab by merely providing the cutback portions 26 whereas if the springs extended in the same direction as entry of the tab there would have to be provided a flared end on the springs to provide proper lead in. Further by placing the spring fingers perpendicular to the line of entry the contact size is kept at a minimum, that is the largest dimension of the receptacle is along the side of the printed circuit board rather than being at right angles to the board. This permits the components to be placed closer to the board and allows for shorter tabs on the components.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. A receptacle for mounting on a printed circuit board member and for receiving a male tab at right angles to the board member, said receptacle comprising a generally rectangular strap portion adapted to be inserted within an aperture in the board member, time means extending from a first pair of opposite sides of said strap portion for engaging circuitry on said board member, a pair of sidewalls extending from a second pair of opposite sides of said strap portion, tab means struck from said sidewalls for engaging said board member on the side opposite to said tine means thereby maintaining said receptacle in position on said board member, and a pair of spring fingers extending from each of said sidewalls and generally perpendicular thereto, said fingers extending in a direction generally parallel to said board member and lying partially within said aperture in said board member, said fingers converging towards each other adjacent their free ends to a nominal spacing which is less than the thickness of the tab to be inserted therethrough, each said finger further having cut-back portions along each of opposite side edges thereof to facilitate entry of said tab, said fingers being capable of receiving said tab from each of opposite sides of said receptacle .

References Cited

UNITED STATES PATENTS

| | | | |
|---|---|---|---|
| 2,770,791 | 11/1956 | Batcheller | 339—258 |
| 3,162,501 | 12/1964 | Wahl | 339—98 |

FOREIGN PATENTS

| | | |
|---|---|---|
| 520,105 | 4/1940 | Great Britain. |
| 876,056 | 8/1961 | Great Britain. |

PATRICK A. CLIFFORD, *Primary Examiner.*

MARVIN A. CHAMPION, *Examiner.*